Figure 1:
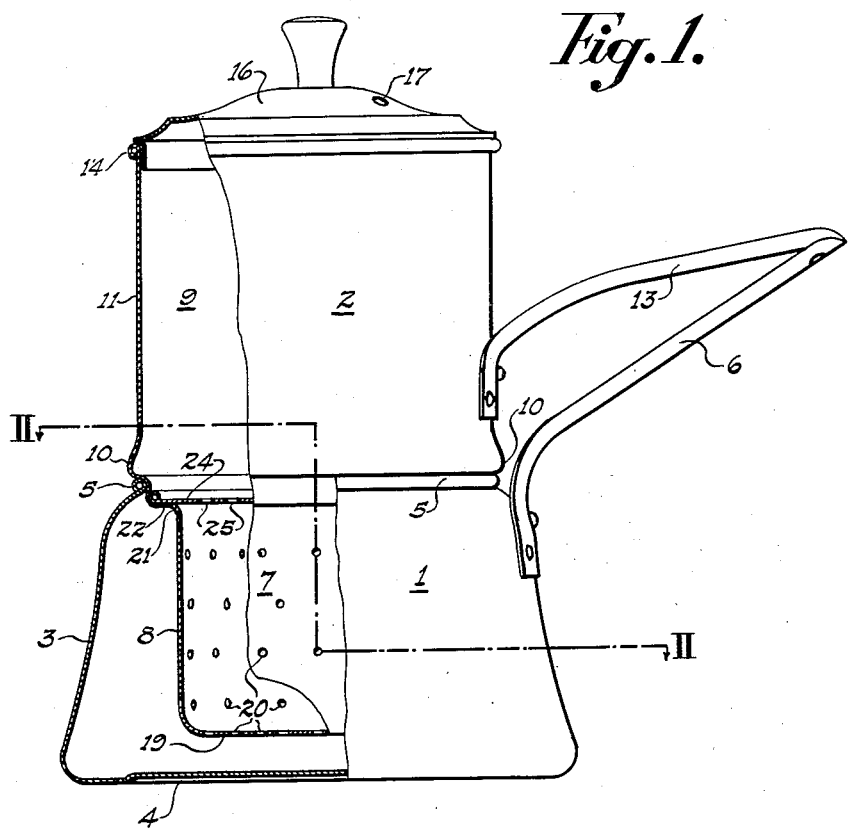

Oct. 9, 1934.     R. P. FLETCHER ET AL     1,976,219
COOKING UTENSIL
Filed Feb. 3, 1933

INVENTOR
RUTH P. FLETCHER
BY CARLTON G. TOWNE
ATTORNEY

Patented Oct. 9, 1934

1,976,219

UNITED STATES PATENT OFFICE 1,976,219

COOKING UTENSIL

Ruth P. Fletcher and Carlton G. Towne, New Kensington, Pa., assignors to The Aluminum Cooking Utensil Company, New Kensington, Pa., a corporation of Pennsylvania Application February 3, 1933, Serial No. 655,048

5 Claims. (Cl. 53—2)

This invention relates to cooking utensils or similar vessels, and more particularly to utensils of the nested type having an inner and an outer pan communicating with each other through perforations in the inner pan.

An object of the invention is to provide an improved cooking utensil of the type designated.

A further object is to provide an improved utensil having a plurality of cooking zones or compartments in which different methods of cooking may be employed simultaneously.

With these and other objects in view, the invention will now be more fully described with reference to the accompanying drawing in which similar reference numerals indicate corresponding parts in all views.

Figure 2:
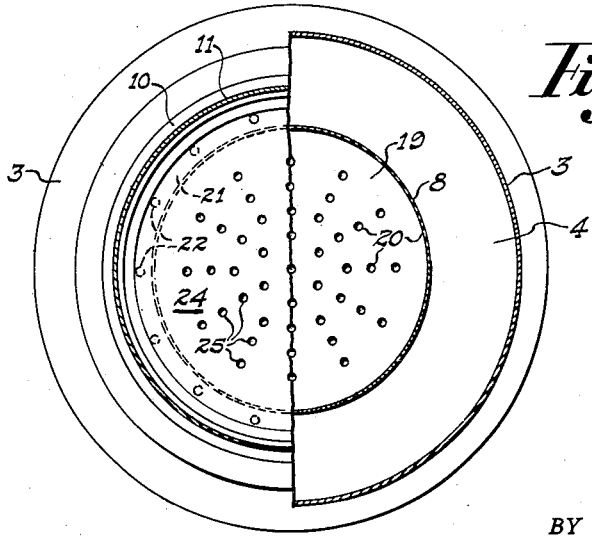

In the drawing:

Fig. 1 is an elevational view, with parts broken away, of a preferred embodiment of the invention; and Fig. 2 is a horizontal sectional view taken on the line II—II of Fig. 1.

In its preferred form, our improved utensil consists of a lower water-containing member or vessel 1, and an upper food-containing vessel 2, nested with and supported by the lower vessel. The lower vessel 1 is preferably constructed with its side walls 3 sloping inwardly from the bottom 4 and terminating in a bead 5 surrounding the top opening or mouth of the vessel. A suitable handle 6 of any desired shape is attached to the side wall 3 by rivets or other known connecting means, and preferably extends outward and angularly upward therefrom.

The upper vessel 2 is so constructed as to enable the utensil to be used as a boiler or steamer or combination boiler and steamer. This vessel has a lower body portion 7 having substantially perpendicular side walls 8 disposed within the lower vessel 1, and an upper body portion 9 extending above the lower vessel. This upper body portion is of sufficient size for at least a part of its height, such as at a shoulder 10, for example, to rest on and be supported by the beaded edge 5 of the lower vessel 1, and the side walls 11 of this upper portion may be perpendicular or inclined. Extending angularly outward from one side of the upper vessel 2 may be a handle 13 of any desired shape, and joined to the vessel in any desired manner. This handle is preferably so disposed that it may be gripped simultaneously with the handle 6. The top edge 14 of the upper vessel 2 is preferably beaded, and on this bead or edge may be placed a cover or lid 16 with or without a vent 17. While the lid 16 may be of any desired shape, it is preferable that its shape and size be such that it fits the top of the upper vessel snugly, thereby facilitating the retention of steam in the utensil.

The side walls 3 and 8 of the lower and upper vessels, respectively, are of such length that the bottom 19 of the upper vessel will be spaced from the bottom 4 of the lower vessel 1 when the vessels are nested and ready for use. The side walls 8 and the bottom 19 of the lower section of the upper vessel are provided with perforations 20, which permit the passage of steam and/or water from one vessel to the other. The upper portion of the side walls 8 is turned outwardly to form a substantially horizontal annular shoulder 21 which connects the side walls of the upper and lower portions of the upper vessel, and which is preferably provided with a series of openings or perforations 22. This shoulder may also be used as a support for a steamer plate 24 provided with perforations 25, if desired.

When using the utensil for cooking, the upper vessel 2 is nested in the lower vessel 1 as shown in the drawing. The nature of the food or other material to be cooked, and the manner in which it is desired to cook it, determine the quantity of water supplied to the lower vessel 1. If it is desired to boil the food, for example, water is supplied to the lower vessel in such quantity that it will enter the perforations 20 and partially or completely cover the food product contained in the lower part of the upper vessel 2. In cooking some foods it is desirable that they be partially steamed and partially boiled. This is true of asparagus, for example, which may be cooked by standing it butt downward in our improved utensil. Water is supplied in sufficient quantity to cover the tough butt-portions of the stalks, which are then boiled when heat is applied, while the tenderer tips extend above the water level into the upper portion 9 of the vessel, where they are cooked by steam entering through the perforations 20 and 22 without loss of flavor or delicacy.

The utensil may also be used as a deep steamer by keeping the level of the water in the lower container 1 below the bottom of the food container 2. When the water is then boiled, the contents of the upper container are thoroughly cooked by steam entering through the perforations 20 and 22. If a two compartment steamer is desired, it is only necessary to insert a steamer plate 24, which may conveniently be supported by the shoulder 21. By the use of the steamer plate or its equivalent, it is also possible to boil one kind of food in the perforated lower part 7 of the upper vessel, while steaming another kind supported on the plate 24 in the upper part 9 of the vessel.

While a preferred embodiment of our invention has been described and illustrated hereinabove by way of example, it is to be understood that various modifications may be made therein without departing from the spirit of the invention, and it is our intention that the claims shall cover such modifications as are included within the scope thereof.

We claim:

1. A cooking utensil comprising an upper vessel and a lower vessel, said lower vessel being provided with a bead surrounding its top opening, and said upper vessel having a lower end portion of reduced cross section adapted for insertion in the lower vessel, a perforated annular shoulder at the top of said lower end portion, and a portion above said shoulder adapted to rest on said bead to support said upper vessel.

2. A cooking utensil comprising an upper vessel and a lower vessel, said lower vessel having a bead surrounding its top opening, and said upper vessel having a lower end portion of reduced cross section for insertion in the lower vessel, a perforated annular shoulder at the top of said reduced lower end portion, and a larger portion above said shoulder adapted to rest on said bead and close the top opening in said lower vessel, and a separable perforated steamer plate resting upon said annular shoulder.

3. A cooking utensil comprising an upper vessel and a lower vessel, said lower vessel having a beaded top opening and upwardly tapering sides, and said upper vessel having a lower end portion adapted for insertion in the said top opening of the lower vessel, said lower end portion having perforations in its side walls and bottom, and an annular perforated shoulder at its top.

4. A cooking utensil comprising a lower water-containing vessel with sides tapering upwardly and inwardly and a beaded top, an upper food-containing vessel having a lower portion with substantially perpendicular perforated side walls and a perforated bottom and an annular perforated shoulder above said perforated side wall, all adapted for insertion in said lower vessel, and an upper portion above said perforated shoulder provided with an imperforate shoulder adapted to snugly engage the beaded top of the lower vessel and having sides extending upwardly therefrom, and a cover adapted to close the top of said upper vessel.

5. A utensil for cooking asparagus and the like, comprising a lower water-containing vessel having a top opening, an upper vessel having a lower end portion of reduced cross-section inserted in said top opening, said portion having perforated side walls and a perforated bottom and extending downwardly nearly to the bottom of said lower water-containing vessel, a perforated annular shoulder at the top of said reduced lower end portion and formed integrally therewith, and an upper end portion of larger cross-section above said shoulder and resting on the top of said lower vessel and closing the opening therein and extending a substantial distance upwardly therefrom to define a steaming compartment.

RUTH P. FLETCHER.
CARLTON G. TOWNE.